March 11, 1958　　　　E. L. MILLS　　　　2,826,108
WRENCH SOCKET FOR WASHER-TYPE NUTS HAVING A LIP ON ONE SIDE
Filed May 11, 1956

INVENTOR.
EDWARD L. MILLS
BY Lothrop & West
ATTORNEYS

United States Patent Office 2,826,108
Patented Mar. 11, 1958

2,826,108
WRENCH SOCKET FOR WASHER-TYPE NUTS HAVING A LIP ON ONE SIDE

Edward L. Mills, Marysville, Calif.

Application May 11, 1956, Serial No. 584,364

2 Claims. (Cl. 81—90)

The invention relates to pole-line hardware and more particularly to a socket for tightening or removing washers of the kind known in the pole-line hardware field as lip washers.

A lip washer is customarily a substantially square-shaped planar metal washer with a central tapped opening and having along one edge an outturned projection or lip enabling a lineman to rotate the washer more easily than would be the case were the lip not provided. After threading the lip washer on a correspondingly threaded steel pin, for example, and taking up on the washer by hand, insofar as possible, the lineman usually applies a "crescent" or comparable wrench to the projecting lip and is able to exert a considerable rotational force on the washer by exerting a torque on the lip thereof.

Quite often, however, and especially under adverse conditions of weather or light, "crescent" wrenches and comparable devices are prone to slip, and bruised knuckles and fingers are a frequent occurrence.

It is therefore an object of the invention to provide a lip-washer socket which can be quickly and easily installed on a lip washer, even in adverse conditions of light and weather, and which swiftly and surely takes up on or backs off a lip washer.

It is another object of the invention to provide a lip-washer socket which is very economical to manufacture and which is therefore within the economic reach of all persons having to deal with lip washers in their line of activity.

Yet another object of the invention is to provide a light and highly portable socket whose operation on lip washers is secure and positive.

It is still a further object of the invention to provide the socket which is convenient to use with existing hand tools ordinarily carried by a lineman, or other person involved in the installation of pole-line hardware.

It is still another object of the invention to provide a lip-washer socket which is easy to carry and which has no moving parts to get out of order.

It is a further object of the invention to provide a generally improved lip-washer socket.

Other objects together with the foregoing are attained in the embodiment described below and shown in the accompanying drawings in which.

While the lip washer socket of the invention is susceptible of numerous physical embodiments depending upon the particular environment and conditions of use, a considerable number of the herein shown and described sockets have been made and used and have performed in eminently satisfactory fashion.

Figure 1:
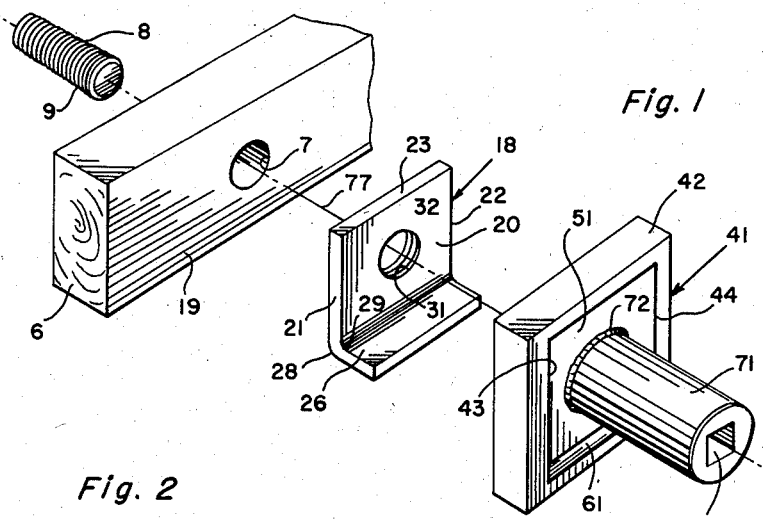
Figure 1 is an exploded view of the lip-washer socket in a customary environment.
Figure 2:
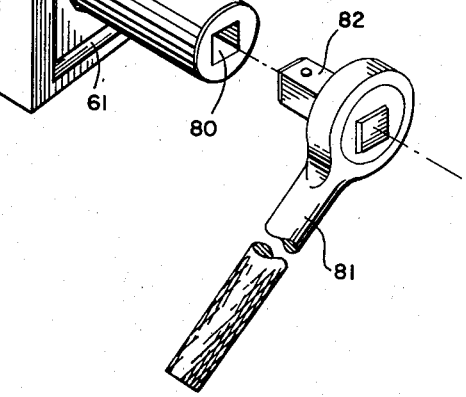
Figure 2 is an end view of the lip washer socket.
Figure 4:
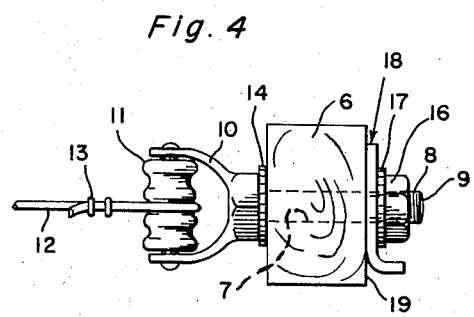
Figure 4 illustrates a typical lip washer as installed by the socket of the invention in a dead-end wire installation.

As appears most clearly in Figures 1 and 4, a typical environmental use of the socket, a dead-end wire installation, is shown, the installation including a crossarm 6 having a through hole 7 in which is located a steel pin 8 threaded at one end 9 and terminating at its opposite end in a yoke 10 provided with a transverse insulator 11 having reeved thereabout a dead-end wire 12 turned back upon itself and held by suitable fastenings 13. A shoulder 14 formed on the pin serves to confine one end of the pin against the crossarm 6 while adjacent the other end is a nut 16 bearing against a customary washer 17 and a lip washer 18 previously threaded onto the pin and rotated into very tight engagement with the adjacent face 19 of the crossarm.

As appears most clearly in Figure 1 the lip washer 18 includes a generally planar substantially square-shaped body 20 having a pair of vertical side edges 21 and 22 and a top edge 23. A lip washer differs from a customary square washer however, in having a slightly elongated lower portion 26 outwardly turned to an attitude substantially normal to the plane of the body 20. An outer radius 28 and an inner radius 29 smoothly connect the outturned portion 26, or lip, with the planar upstanding portion 20. A substantially centrally located circular opening 31 provided with threads 32 is formed in the body portion 20 of the washer and is placed in threaded engagement with the pin 8 after the pin is inserted through the crossarm and the pin shoulder 14 is seated against the crossarm base.

It is essential that the lip washer be tightly taken up and firmly seated to create a good installation. In order to effect rapid rotation of the lip washer and tight abutment with the crossarm the lip-washer socket, generally designated 41, is utilized. A substantially rectangular marginal frame 42 is appropriately dimensioned so that the distance between its inner opposite side edges 43 and 44 is slightly in excess of the distance between the corresponding vertical edges 21 and 22 of the lip washer with which the socket is to be utilized. In other words, a fairly snug fit on the sides of the lip washer is provided.

The thickness of the marginal frame 42, measured between the front side 45 and the rear side 46, exceeds somewhat the thickness, or gauge, of the material of the lip washer. As appears most clearly in Figure 3 a plate 51 is mounted in a central substantially rectangular opening 52 formed by the marginal frame, the plate 51 being secured to the frame as by weldments 53. The thickness of the plate 51 is such that its thickness when taken in conjunction with the thickness or gauge of the lip-washer body substantially equals the thickness of the marginal frame 42. In other words, the body 20 of the lip washer is encompassed by the marginal frame and fits fairly snugly in a recess 56 defined by the inner wall 57 of the plate and the surrounding or confining inner walls of the marginal frame.

The lower edge 58 of the plate 51 is rounded to form an arcuate portion 59 substantially equivalent in radius to the inner radius 29 of the lip washer, and thus the plate abuts or engages the washer fairly snugly. The lip 26 of the washer projects outwardly and in a forward direction from the plate and frame through a slot 61, or gap, existing between the lower edge 58 of the plate and the upper or inner boundary 62 of the lower wall 63 of the marginal frame.

Figure 3:
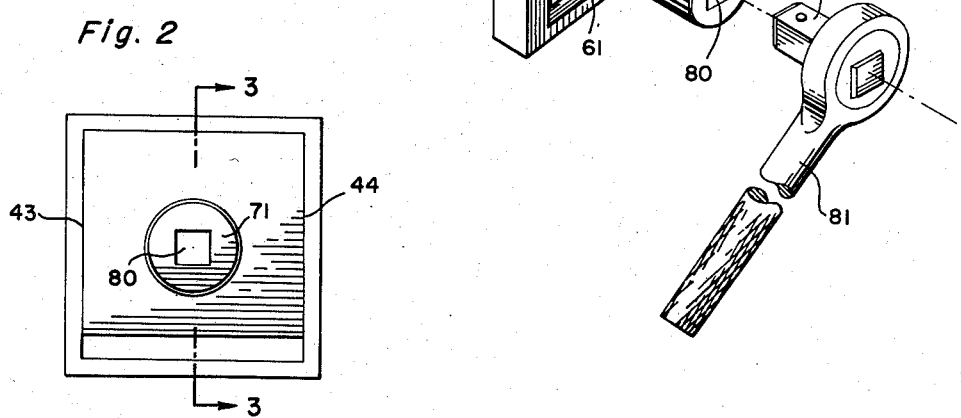
Figure 3 is a sectional view of the socket, the plane of section being indicated by the line 3—3 of Figure 2.

While the slot 61 can be made to a dimension narrower or smaller than that appearing in Figure 3, in order to confine even more closely the lower side of the lip 26, it is found in actual practice that the rotational effort exerted on the upper edge 23 and on the two opposite side edges 21 and 22 of the washer by the marginal frame, as well as the effort exerted by the plate on the uppermost surface of the lip 26, as appears in Figure 3, is sufficient so that it is not also necessary to cause a rotational effort to be exerted against the lower face of the lip 26. Furthermore, the added height of the slot 61 serves to enable the lineman to insert the socket quickly and easily over the lip washer under all conditions of adverse light and weather.

The rotational effort on the plate 51 and marginal frame 42 is exerted by the provision of a hollow cylindrical stud 71 mounted normally on the plate as by weldments 72. The walls 73 of the stud 71 enclose or define a cylindrically shaped aperture 74 having a longitudinal axis 76 coaxial with the common axis 77 of the pin 8, the lip washer opening 31, and a circular aperture 78 in the plate, the aperture 78 having a countersunk portion 79 for greater ease in guiding the socket over a pin 8 and onto a lip washer preparatory to removal of the washer. The aperture 74 is made long enough so that the inwardly extending pin 8 will not interfere with the seating home of the lip washer. Rotational effort can thereupon be exerted on the stud either by forming the outer end of the stud into a square, or hexagonal shape so as to permit engagement with a wrench, or by forming an opening 80 in the stud so as to receive a wrench 81 having the usual snap-on type of stud 82.

It can therefore be seen that I have provided a lip-washer socket enabling a line man or other pole-line hardware worker quickly and easily to install a lip washer under all conditions of use and operation, and to remove, with equal ease, a lip washer previously installed.

What I claim is:

1. A socket for use in rotating a lip washer having a substantially square planar body with a circular opening and an out-turned lip normal to said body, said socket comprising a plate having a circular aperture for registry with the opening in a lip-washer body, one edge of said plate being rounded to conform to the inner radius connecting a washer body and lip, a rectangular marginal frame mounted on said plate and having a thickness greater than said plate to form a recess adapted to receive the body of a lip washer, said frame having a length greater than the length of said plate to leave a slot between said rounded edge of said plate and the corresponding margin of said frame to receive the lip of a washer, and a stud mounted normally on said plate, said stud having an interior hollow circular cylindrical compartment in registry with said aperture, and an outer portion adapted to receive a ratchet wrench.

2. A socket for use with a lip washer having a planar body with a substantially central circular opening and an out-turned lip along one edge, said socket comprising a rectangular marginal frame adapted to encompass such a washer, a plate mounted on said frame, said plate being shorter than the distance between one pair of opposite margins of said frame to form a lip-receiving slot, said plate having a circular aperture for registry with the opening in a washer, and a hollow stud coaxially mounted on said plate over said aperture, said stud being provided at its free end with means for connecting it to ratchet wrench.

References Cited in the file of this patent
UNITED STATES PATENTS

| | | |
|---|---|---|
| 198,544 | Kettlewell | Dec. 25, 1877 |
| 1,694,380 | Hansen | Dec. 11, 1928 |
| 2,538,343 | Van Winkle | Jan. 16, 1951 |